(12) United States Patent
Liu et al.

(10) Patent No.: US 12,346,797 B2
(45) Date of Patent: Jul. 1, 2025

(54) PROGRAMMABLE ACCESS ENGINE ARCHITECTURE FOR GRAPH NEURAL NETWORK AND GRAPH APPLICATION

(71) Applicant: Alibaba Damo (Hangzhou) Technology Co., Ltd., Zhejiang (CN)

(72) Inventors: Heng Liu, Shanghai (CN); Shuangchen Li, Sunnyvale, CA (US); Tianchan Guan, Shanghai (CN); Hongzhong Zheng, Los Gatos, CA (US)

(73) Assignee: Alibaba Damo (Hangzhou) Technology Co., Ltd., Hangzhou (CN)

( * ) Notice: Subject to any disclaimer, the term of this patent is extended or adjusted under 35 U.S.C. 154(b) by 822 days.

(21) Appl. No.: 17/574,519

(22) Filed: Jan. 12, 2022

(65) Prior Publication Data

US 2023/0128180 A1    Apr. 27, 2023

(30) Foreign Application Priority Data

Oct. 26, 2021  (CN) .......................... 202111250322.8

(51) Int. Cl.
*G06F 9/22*    (2006.01)
*G06F 9/30*    (2018.01)
(Continued)

(52) U.S. Cl.
CPC ........... *G06N 3/063* (2013.01); *G06F 9/3004* (2013.01); *G06F 16/9024* (2019.01); *G06N 3/04* (2013.01); *G06N 3/08* (2013.01)

(58) Field of Classification Search
CPC .............................. G06N 3/063; G06F 16/9024
See application file for complete search history.

(56) References Cited

U.S. PATENT DOCUMENTS 9,076,107 B2    7/2015  Cameron et al.
11,010,681 B2 *  5/2021  Lin ..................... G06F 9/5061
(Continued)

FOREIGN PATENT DOCUMENTS

CN    110751275 A    2/2020
CN    112612761 A    4/2021
(Continued)

OTHER PUBLICATIONS

Taikun Zhang, A Software-Programmable Neural Processing Unit for Graph Neural Network Inference on FPGAs, 2024, pp. 187-196.*

(Continued)

*Primary Examiner* — Cheng Yuan Tseng
(74) *Attorney, Agent, or Firm* — Sheppard Mullin Richter & Hampton LLP

(57) ABSTRACT

This specification describes methods and systems for accessing attribute data in graph neural network (GNN) processing. An example system includes: a plurality of cores, each of the plurality of cores comprises a key-value fetcher and a filter, and is programmable using a software interface to support a plurality of data formats of the GNN attribute data, wherein: the key-value fetcher is programmable using the software interface to perform key-value fetching associated with accessing the GNN attribute data, and the filter of at least one of the plurality of cores is programmable using the software interface to sample node identifiers associated with accessing the GNN attribute data; and a first memory communicatively coupled with the plurality of cores, wherein the first memory is configured to store data shared by the plurality of cores.

20 Claims, 8 Drawing Sheets

(51) Int. Cl.
   *G06F 16/901* (2019.01)
   *G06N 3/04* (2023.01)
   *G06N 3/063* (2023.01)
   *G06N 3/08* (2023.01)

(56) References Cited

U.S. PATENT DOCUMENTS

| | | | |
|---|---|---|---|
| 11,023,360 B2* | 6/2021 | Gu | G06F 30/27 |
| 11,106,976 B2 | 8/2021 | Flamant | |
| 11,263,168 B2* | 3/2022 | Liao | G06F 16/9024 |
| 11,789,895 B2* | 10/2023 | Wang | G06F 9/4881 |
| | | | 712/29 |
| 11,816,149 B2* | 11/2023 | Zhang | G06V 10/7635 |
| 11,827,238 B2* | 11/2023 | Meyer | G01S 13/931 |
| 11,868,912 B2* | 1/2024 | Shin | G06N 5/042 |
| 2017/0368682 A1 | 12/2017 | Danjo et al. | |
| 2019/0303762 A1* | 10/2019 | Sui | G06N 3/04 |
| 2020/0042863 A1* | 2/2020 | Wang | G06N 3/045 |
| 2020/0279151 A1 | 9/2020 | Li et al. | |
| 2020/0337648 A1 | 10/2020 | Saripalli et al. | |
| 2020/0364567 A1* | 11/2020 | Oh | G06N 3/045 |
| 2021/0081717 A1 | 3/2021 | Creed et al. | |
| 2021/0125067 A1* | 4/2021 | Kamatani | G06N 3/088 |
| 2021/0192358 A1 | 6/2021 | Song et al. | |
| 2021/0216851 A1* | 7/2021 | Lee | G06N 3/042 |
| 2021/0256355 A1 | 8/2021 | Chen et al. | |
| 2021/0326389 A1 | 10/2021 | Sankar et al. | |
| 2021/0374356 A1* | 12/2021 | He | G06N 5/022 |
| 2022/0044098 A1* | 2/2022 | Asad | G06N 3/10 |
| 2022/0327101 A1* | 10/2022 | Pool | G06N 3/082 |
| 2023/0004775 A1* | 1/2023 | Bourge | G06N 3/105 |

FOREIGN PATENT DOCUMENTS

| | | |
|---|---|---|
| CN | 112988615 A | 6/2021 |
| CN | 113010547 A | 6/2021 |
| CN | 113032289 A | 6/2021 |
| CN | 113191486 A | 7/2021 |
| CN | 113240089 A | 8/2021 |

OTHER PUBLICATIONS

First Search for Chinese Application No. 202111250322.8 mailed on Sep. 5, 2024.

First Office Action for Chinese Application No. 202111250322.8 mailed on Sep. 11, 2024. English machine translation provided.

* cited by examiner

PROGRAMMABLE ACCESS ENGINE ARCHITECTURE FOR GRAPH NEURAL NETWORK AND GRAPH APPLICATION

CROSS REFERENCE TO RELATED APPLICATIONS

This application claims priority to and benefits of Chinese patent Application No. 202111250322.8, filed with the China National Intellectual Property Administration (CNIPA) on Oct. 26, 2021. The entire contents of the above-identified application are incorporated herein by reference.

TECHNICAL FIELD

This specification relates to the field of Graph Neural Networks (GNNs), and in particular, to accelerating data access for GNNs.

BACKGROUND

Graph neural networks ("GNNs") may be an effective model for unstructured data modeling and processing. Recently, GNNs are becoming more and more utilized in applications such as recommendation systems, risk control systems, etc. Graph data may be unstructured. As a result, accessing graph data may result in random memory accesses.

SUMMARY

Embodiments of this specification provide a system for accessing graph neural network (GNN) attribute data in GNN processing, comprising: a plurality of cores, each of the plurality of cores comprises a key-value fetcher and a filter, and is programmable using a software interface to support a plurality of data formats of the GNN attribute data, wherein: the key-value fetcher is programmable using the software interface according to one of the plurality of data formats of the GNN attribute data for performing key-value fetching associated with accessing the GNN attribute data, and the filter of at least one of the plurality of cores is programmable using the software interface according to the one of the plurality of data formats of the GNN attribute data for sampling node identifiers associated with accessing the GNN attribute data; and a first memory communicatively coupled with the plurality of cores, wherein the first memory is configured to store data shared by the plurality of cores.

In some embodiments, the software interface comprises at least one or more of the following configurable parameters for programming the key-value fetcher: a memory address of the first memory storing a key of the key-value fetching; a memory address of a second memory storing a value of the key-value fetching; a number of key-value pairs to fetch; a length of data to fetch; a target memory address of the first memory for writing results; or a flag indicating whether reordering is enabled.

In some embodiments, the software interface comprises at least one of the following configurable parameters for programming the filter: a sampling algorithm; or a regular expression for filtering sampled results generated by the sampling algorithm.

In some embodiments, the key-value fetcher of at least one of the plurality of cores is further programmable through the software interface to: determine a memory address of the first memory storing a value corresponding to the key; fetch the value corresponding to the key from the memory address; and write the fetched value into the first memory.

In some embodiments, the plurality of cores include a first core; the key-value fetcher of the first core is programmable through the software interface to: determine an address in the first memory from which to fetch edge data of a root node, wherein the edge data includes identifiers of neighboring nodes of the root node, and fetch, from the determined address, the edge data of the root node; and the filter of the first core is programmable through the software interface to: sample from the identifiers of neighboring nodes in the edge data to determine one or more sampled node identifiers using a sampling algorithm, and write the one or more sampled node identifiers into the first memory.

In some embodiments, the edge data of the root node includes a weight value on each edge of the root node; and the filter of the first core is further programmable through the software interface to: sample according to the weight value on each edge of the root node to determine the one or more sampled node identifiers.

In some embodiments, the plurality of cores include a second core; and the key-value fetcher of the second core is programmable through the software interface to: determine an address in the first memory from which to fetch an edge list pointer of the root node, fetch, from the determined address, the edge list pointer of the root node, wherein the edge list pointer points to a list of edges of the root node stored in a second memory, and each of the list of edges connects the root node to a neighboring node, fetch one or more identifiers of the neighboring nodes of the root node based on the list of edges of the root node from the second memory, and write the one or more identifiers of the neighboring nodes of the root node into the first memory for the first core to access.

In some embodiments, the plurality of cores include a third core; and the key-value fetcher of the third core is programmable through the software interface to: receive a root node identifier corresponding to the root node, determine the edge list pointer according to the root node identifier, and write the edge list pointer into the first memory for the second core to access.

In some embodiments, the plurality of cores include a third core and a fourth core; the key-value fetcher of the third core is programmable through the software interface to: receive a root node identifier corresponding to the root node, fetch a pointer corresponding to the root node according to the root node identifier, wherein the pointer corresponding to the root node identifier points the root node's structure data, and the root node's structure data includes the edge list pointer, and write the pointer corresponding to the root node into the first memory for the fourth core to access; and the key-value fetcher of the fourth core is programmable through the software interface to: determine an address in the first memory from which to fetch the pointer corresponding to the root node; fetch, from the determined address, the pointer corresponding to the root node from the memory buffer, determine the edge list pointer according to the pointer corresponding to the root node, and write the edge list pointer to the first memory for the second core to access.

In some embodiments, the plurality of cores include a fifth core and a sixth core; the key-value fetcher of the fifth core is programmable through the software interface to: determine an address in the first memory from which to fetch the sampled node identifiers, fetch, from the determined address, the sampled node identifiers from the first memory, fetch sampled pointers pointing to attribute data of the sampled node identifiers stored in a second memory, and write the sampled pointers to the first memory for the sixth core to access; and the key-value fetcher of the sixth core is programmable through the software interface to: determine an address in the first memory from which to fetch the sampled pointers, fetch, from the determined address, the sampled pointers from the first memory, fetch the attribute data from the second memory using the sampled pointers, and send the attribute data to a dedicated processor for GNN processing.

In some embodiments, each of the plurality of cores further comprises a reorder score board, wherein the reorder score board is programmable through the software interface to: receive data from the key-value fetcher or the filter in the same core; and sorting the received data, In some embodiments, each of the plurality of cores are implemented on field programmable gate arrays (FPGA).

According to the methods and systems of this specification, the GNN memory access system may be implemented as a GNN accelerator. The GNN accelerator may include a plurality of cores that are configurable through software programmable interface(s). With the software programmable interface(s), the GNN accelerator may be configured or programmed to provide great flexibility in processing GNN data access. Because the cores of the GNN memory access system are programmable, they may be flexibly programmed to fit a variety of different data formats (e.g., data structures or layouts), including a compressed sparse row (CSR) format, a coordinate (COO) format, a linked list format, an array format, a dynamic graph format, a key-values format, a weight value on edge format, a coded attribute format, an indirect node-identifier format, an arbitrary number of hops format, a skipping fetch weight or attribute format, other formats, or any combination thereof. In comparison to existing GNN accelerators with internal pipelines hard-coded/wired for processing a specific GNN data formats, the GNN memory access system described herein is programmable to be compatible with known mainstream GNN data formats. Therefore, the functionalities of the GNN memory access system is improved, and the usability of the system is expanded to handle and support GNNs represented in different data formats.

DETAILED DESCRIPTION

The following describes details of embodiments of this specification with reference to the accompanying drawings. The accompanying drawings show some embodiments of this specification, and this specification may be implemented in various manners and is not limited by the embodiments described herein. Rather, these embodiments are provided, so that this specification is more thoroughly understood and the scope of this specification is completely conveyed to a person skilled in the art.

In many embodiments, the steps of corresponding methods are not necessarily performed according to a sequence shown and described in this specification. In some other embodiments, the methods may include more or fewer steps than those described in this specification. In addition, a single step described in this specification may be divided into a plurality of steps for description in other embodiments, and a plurality of steps described in this specification may be combined into a single step for description in other embodiments.

Data may be structured or unstructured. For structured data, information may be arranged according to a pre-set data model or schema. For unstructured data, information may not be arranged using a preset-data model or a pre-defined manner. For example, a text file (e.g., emails, reports, etc.) may include information (e.g., individual letters or words) that does not have a pre-defined structure. As a result, the unstructured data may include irregularities and ambiguities that make it difficult to understand using traditional programs or data structures.

One way to represent unstructured data is by using graphs. A graph is a data structure comprising two components-nodes (or vertices) and edges. For example, a graph G may be defined as a collection of a set of nodes V and a set of edges E between the set of nodes. A node in a graph may have a set of features or attributes (e.g., a user profile). For example, a node may have up to f number of features or attributes. As a result, for a graph with n number of nodes, a node attribute matrix may have a dimension of n by f. A node may be defined as an adjacent node of another node, if the node shares an edge with the other node. The graph may be a highly flexible data structure, as the graph may not require pre-defined rules to determine how many nodes or edges have to be in the graphs. Because the graph may provide great flexibility, it is one of the data structures that are widely used to store or represent unstructured data (e.g., text files).

Figure 1:
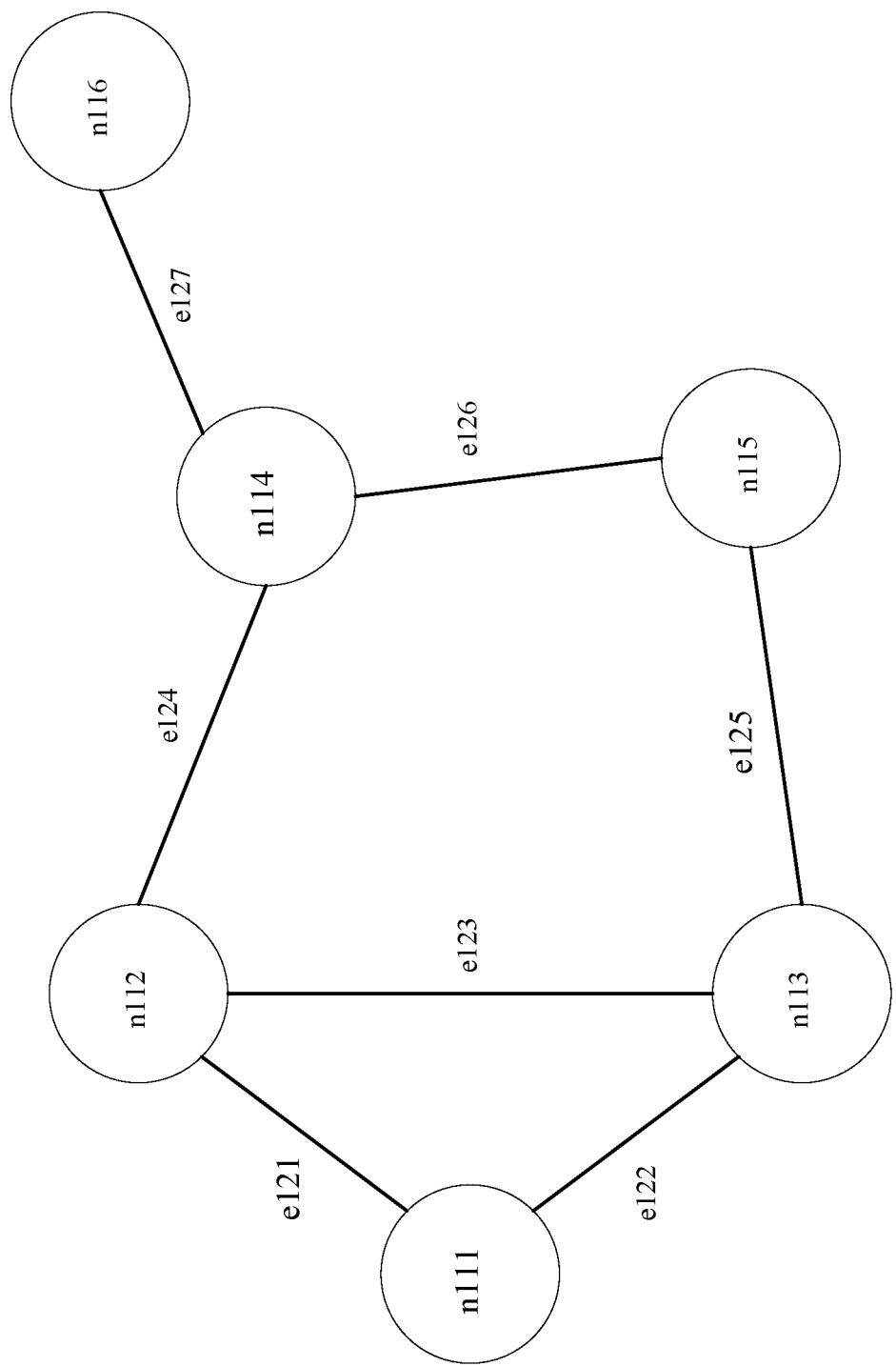
FIG. 1 is a schematic of an example graph, according to some embodiments of this specification.

FIG. 1 is a schematic of an example graph, according to some embodiments of this specification. As shown in FIG. 1, a graph 100 comprises nodes n111, n112, n113, n114, n115, and n116. Further, the graph 100 comprises edges e121, e122, e123, e124, e125, e126, and e127. Each of the nodes has one or more adjacent nodes. For example, nodes n112 and n113 are adjacent to node n111, since node n112 shares with node n111 edge e121 and node n113 shares with node n111 edge e122.

When storing a graph in a memory, the nodes, edges, and attributes may be stored in many different data formats (also called data structures). For example, graphs may be stored in a compressed sparse row (CSR) format, a coordinate (COO) format, a linked list format, an array format, a dynamic graph format, a key-values format, a weight value on edge format, a coded attribute format, an indirect node-identifier format, an arbitrary number of hops format, a skipping fetch weight or attribute format, etc. Different data formats may require different data accessing methods.

With the array format, node identifiers of a graph may be stored in an array, with each node identifier providing an address or a pointer to the location of the attribute data for the corresponding node. The attributes for all nodes may be stored together, and they may be accessed by reading the address or the pointer stored in the corresponding node identifiers. By separating the attribute data from the corresponding nodes, the data structure may provide faster traversing access on the graph.

With the CSR format, nodes and edges of a graph may be stored in separate arrays, with the indices of these arrays corresponding to node identifiers and edge identifiers. The edge array may be sorted by the source of each edge, and includes edge information or the node identifier on the other end of the edge. The node array may store offsets into the edge array, providing offsets for the first edge of each node. For example, as shown in FIG. 1, the edge array for the graph may be "n112, n113, n111, n113, n114, n111, n112, n115, n112, n115, n116, n113, n114, n114." The first two entries "n112" and "n113" represent two edges originating from the first node n111. The next three entries "n111," "n113" and "n114" represent three edges originating from the second node n112. The same logic may be applied to the rest of the edge array. The node array may include only the offset in the edge array, such as "1, 3, 6, 9, 12, 14." The CSR format is considered suitable for storing sparse graphs by packing entries in compressed arrays, allowing for quick traversals of the graph's nodes and edges.

With the COO format, the edges of a graph may be stored as a list of tuples, where the tuple of each edge may include source node identifier, destination node identifier, suitable attribute information of the edge, or any combination thereof. For example, as shown in FIG. 1, the edge e121 may be represented as [n111, n112]. In some embodiments, if the edges are weighted, an extra entry in the tuple may be created to record the value of the weight for each edge. For example, as shown in FIG. 1, if the edge 121 has a weight value of 3, the tuple representation is [n111, n112, 3]. In some embodiments, graph data stored in the COO format is unsorted. For example, the tuples for all the edges may be stored in any order. The COO format may be suitable for graphs that are frequently updated. For example, if a new node or a new edge is added to the graph, the COO format simply needs to add one or more tuples for the newly added data.

With the linked list format, the nodes and/or edges of the graph may be stored in a linked list. For example, the graph nodes may be stored in a first linked list, and the edges may be stored in a second linked list. The first linked list and the second linked list may be cross-referenced (e.g., by using cross-lists pointers). In comparison to array-based data formats, linked list-based data formats may provide better flexibility and a higher random access speed but may suffer a lower sequential access speed.

With the dynamic graph format, the graph may be expanded using data structures such as the linked list.

With the key-value search and the key-value invert search format, the nodes and/or edges of a graph may be stored as key-value pairs so that key-value search may be performed efficiently on the graph. For example, for a given node identifier, the key-value search format may perform an efficient search for the node identifier's attribute data, edges, or adjacent nodes. Moreover, an inverse search may also be performed in an efficient manner. For example for a given attribute data, an edge, or an adjacent node, the key-value inverse search format may perform an efficient search for the corresponding node identifier.

With the weight value on edge format, each edge in the graph may carry a weight value (e.g., similar to the COO format). The weight values on the edges may be used in, for example, GNN sampling processes.

With the coded attribute format, the memory location of the attribute data for a node may be acquired by performing additional computation based on the node's node identifier. The computation may refer to decoding the encoded memory location of the attribute data.

With the arbitrary number of hops format, nodes that are indirectly connected to a given node may be accessed efficiently. For example, as shown in FIG. 1, node n116 is connected with the node n111 via at least three edges (e.g., edges e121, e124, and e127). Although the node n116 is three edges away from the node n111, the node n116 may still be accessed in an efficient manner if the node n111 is given.

With the skipping fetch weight or attribute format, the attribute data and the weight value of the edge do not have to be fetched together. For example, for a given node identifier, the weight values of its edges may be fetched efficiently without fetching the attribute data corresponding to the node identifier or the node identifier's adjacent nodes.

A graph neural network (GNN) is a type of neural network that may directly operate on a graph. The GNN may be more suitable than traditional neural networks (e.g., a convolutional neural network) for operations on a graph, since the GNN may be better equipped to accommodate the arbitrary size of the graph or the complex topology of the graph. The GNN may perform inference on data described in graph formats. The GNN is capable of performing node-level, edge-level, or graph-level prediction tasks.

GNN processing may involve GNN training and GNN inference, both of which may involve GNN computations. A typical GNN computation on a node (or vertex) may involve aggregating its neighbor's (direct neighbors or each neighbor's neighbors) features and then computing new activations of the node for determining a feature representation (e.g., feature vector) of the node. Therefore, GNN processing for a small number of nodes often requires input features of a significantly larger number of nodes. Taking all neighbors for message aggregation is too costly since the nodes needed for input features would easily cover a large portion of the graph, especially for real-world graphs that are colossal in size (e.g., with hundreds of millions of nodes with billions of edges).

Figure 2:
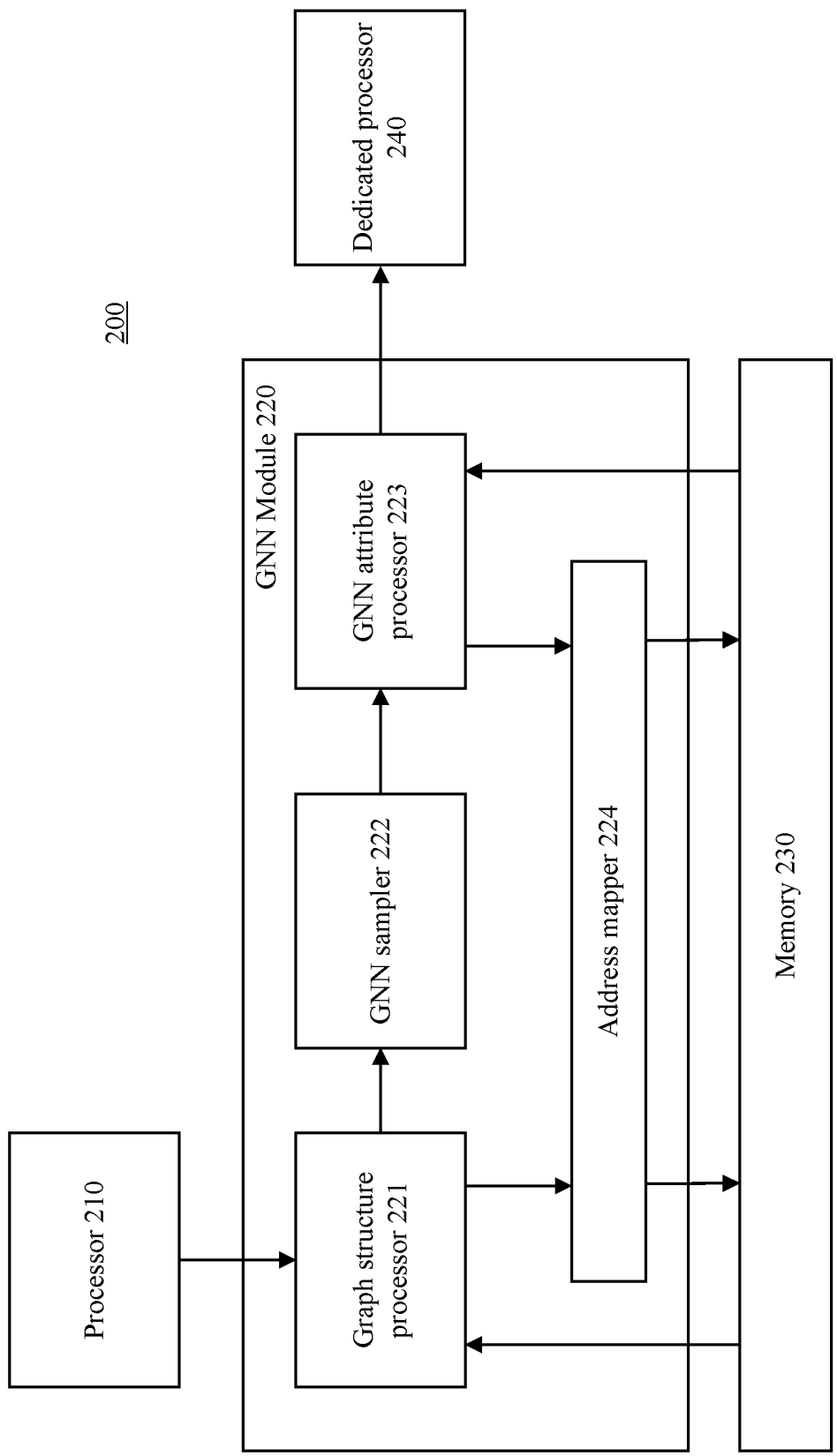
FIG. 2 is a schematic of an example system using GNN accelerator architecture, according to some embodiments of this specification.

To perform GNN, a system may retrieve graph data from a memory, and send the data to one or more processors for processing. FIG. 2 is a schematic of an example system using GNN accelerator architecture, according to some embodiments of this specification. As shown in FIG. 2, a system 200 comprises one or more processors 210, a GNN module 220, a memory 230, and one or more dedicated processors 240. In some embodiments, the one or more processors 210 comprises one or more central processing units (CPU). In some embodiments, the one or more dedicated processors 240 may include one or more graphic processing units (GPU) or dedicated neural network processing units (e.g., dedicated graphic neural network processing units). In some embodiments, the memory 230 may include Synchronous Dynamic Random-Access Memory (SDRAM), such as a Double Data Rate (DDR) SDRAM.

As shown in FIG. 2, the GNN module 220 may receive instructions and information on a GNN from the one or more processors 210, and extract data related to the GNN from the memory 230. After receiving the data from the memory 230, the GNN module 220 may process the data, and send the processed data to the one or more dedicated processors 240 for processing.

In some embodiments, as shown in FIG. 2, the GNN module 220 may include a graph structure processor 221, a GNN sampler 222, a GNN attribute processor 223, and an address mapper 224. The graph structure processor 221 may receive instructions and information on the GNN from the one or more processors 210, and fetch information on more or more nodes and their edges from the memory 230. The graph structure processor 221 may then send the fetched information to the GNN sampler 222.

The GNN sampler 222 is configured to select, according to the edge information of the one or more nodes, one or more sampled nodes for GNN processing. In some embodiments, the GNN sampler 222 may select the one or more sampled nodes according to positive sampling or negative sampling. For example, based on positive sampling, the one or more sampled nodes may be selected from nodes that are adjacent to the one or more nodes. It is appreciated that the sampled nodes may be selected using any algorithms other than the positive sampling and the negative sampling.

Having selected the sampled nodes, the GNN sampler 222 may send the selection information of the sampled nodes to the GNN attribute processor 223. Based on the information of the sampled nodes, the GNN attributed processor 223 is configured to fetch from the memory 230 information of the sampled nodes. In some embodiments, the information of the sampled nodes may include one or more features of each of the sampled nodes. The GNN sampler 222 may be further configured to send the fetched information of the sampled nodes and the information of the one or more nodes and their edges to the dedicated processors 240. The dedicated processors 240 may perform GNN processing based on the information received from the GNN attribute processor 223.

In some embodiments, the graph structure processor 221 and the GNN attribute processor 223 may fetch information from the memory 230 using the address mapper 224. The address mapper may be configured to provide hardware address information in the memory 230 based on node identifiers and edges. For example, a node as a part of an input GNN may be identified using an identifier n111 (e.g., node n111 of FIG. 1). If the graph structure processor 221 intends to fetch information of the node n111 (e.g., attribute data of the node n111), the graph structure processor 221 may provide the identifier n111 to the address mapper 224, and the address mapper 224 may determine a physical address in the memory 230 where the information for the node n111 (e.g., the attribute data of the node n111) is stored. In some embodiments, the address mapper 224 may also determine one or more physical addresses in the memory 230 where information on the edges of the node n111 is stored (e.g., edges e121 and e122 of FIG. 1).

Figure 3:
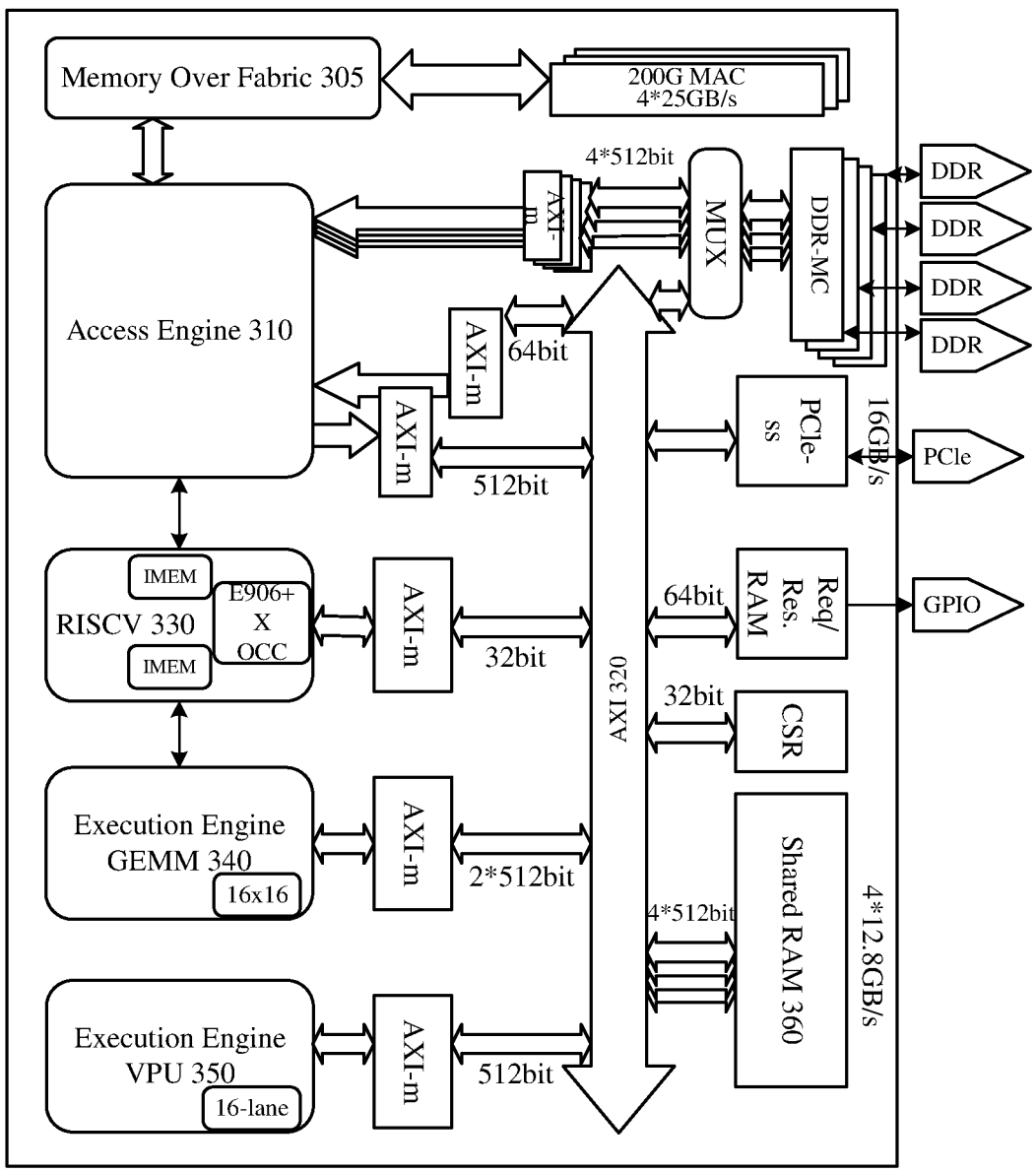
FIG. 3 is a schematic of an example system for accelerating GNN performance, according to some embodiments of this specification.

The system 200 shown in FIG. 2 may be used to accelerate GNN memory access for many different systems in accelerating GNN performance. FIG. 3 is a schematic of an example system for accelerating GNN performance, according to some embodiments of this specification. As shown in FIG. 3, system 300 comprises an access engine 310. The access engine 310 shown in FIG. 3 may be similar to the GNN module 220 shown in FIG. 2. The access engine 310 may be configured to retrieve, from memory (e.g., DDRs as shown in FIG. 3), data needed for performing GNN calculations. For example, the access engine 310 may retrieve node identifiers, edge identifiers, and attribute data corresponding to the node identifiers. The data retrieved by the access engine 310 may be provided to the execution engines (e.g., execution engine GEMM 340 or execution engine VPU 350) or processors for GNN-related calculations. For example, as shown in FIG. 3, the system 300 comprises two execution engines, execution engine GEMM 340 and execution engine VPU 350. The execution engine GEMM 340 may be configured for General Matrix Multiply (GEMM) algorithms and the execution engine VPU 350 may be configured for vector processing units (VPU). Both types of engines may perform specific GNN-related calculations in an accelerated manner.

Figure 4:
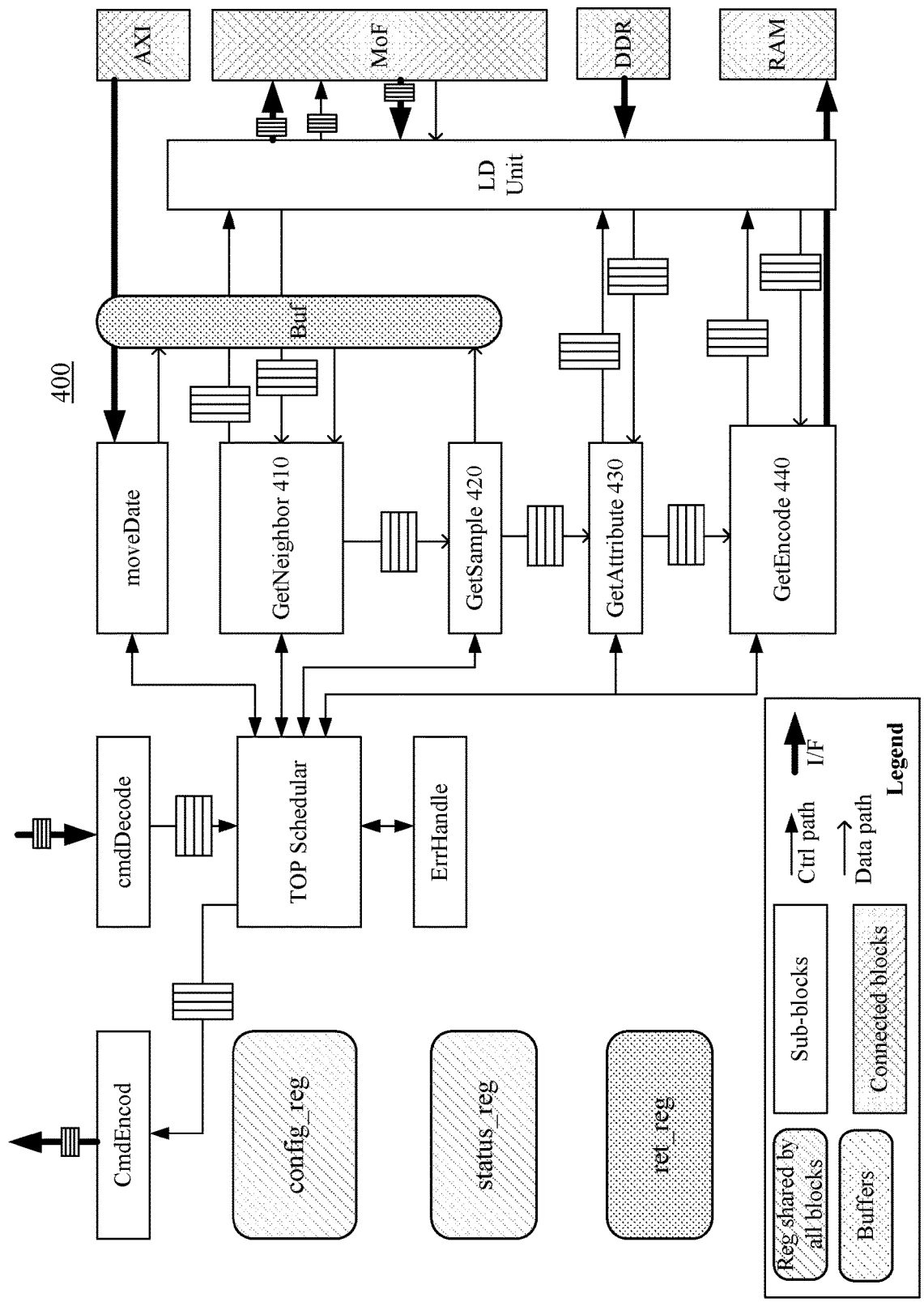
FIG. 4 is a schematic of an example GNN access engine, according to some embodiments of this specification.

Although the system 300 may include accelerated engines and processors to speed up GNN-related calculations, it is the access engine 310 that may become a bottleneck for the overall performance of the system 300, since the data retrieval performed by the access engine may be slower than the execution engines performing data processing. FIG. 4 is a schematic of an example GNN access engine, according to some embodiments of this specification. It is appreciated that an access engine 400 shown in FIG. 4 may be similar to the access engine shown in FIG. 3. As shown in FIG. 4, the access engine 400 may include a GetNeighbor module 410, a GetSample module 420, a GetAttribute module 430, and a GetEncode module 440.

In some embodiments, the GetNeighbor module 410 is configured to access or identify adjacent nodes for an input node identifier. For example, similar to the graph structure processor 221 shown in FIG. 2, the GetNeighbor module 410 may receive instructions and information on the GNN, and fetch information on one or more nodes, their edges, and their neighbors (adjacent nodes) from DDRs (e.g., corresponding to the memory 230 of FIG. 2). The GetNeighbor module 410 may then send the fetched information to the GetSample module 420 (e.g., corresponding to the GNN Sampler 222 of FIG. 2).

In some embodiments, the GetSample module 420 is configured to receive information on one or more nodes from the GetNeighbor module 410 and perform node sampling on the one or more nodes for GNN processing. For example, similar to the GNN sampler 222 shown in FIG. 2, The GetSample module 420 may be configured to select, according to the edge information of the one or more nodes, one or more sampled nodes for GNN processing. In some embodiments, the GNN sampler 222 may select the one or more sampled nodes according to positive sampling and/or negative sampling. Having selected the sampled nodes, the GetSample module 420 may send the selection information of the sampled nodes to the GetAttribute module 430.

In some embodiments, the GetAttribute module 430 may be configured to receive information of selected or sampled nodes from the GetSample module 420 and fetch attribute information on the sampled nodes from memory (e.g., DDRs shown in FIG. 4 or memory 230 shown in FIG. 2). For example, similar to the GNN attribute processor 223, the GetAttribute module 430 may be configured to fetch from the memory 230 attribute data of the sampled nodes based on the received sampled nodes (e.g., sampled node identifiers). In some embodiments, the attribute data of the sampled nodes may include one or more features of each of the sampled nodes.

As shown in FIG. 2, FIG. 3, and FIG. 4, when a GNN-based system performs memory access (e.g., via the access engine of FIG. 3), the GNN-based system may engage its hard-coded/wired internal pipeline (e.g., the modules 410-440 of FIG. 4) to perform a number of steps, including determining neighbors, sampling nodes, and fetching attributes on the sampled nodes. The hard-coded/wired internal pipeline of the access engine in the GNN-based system implies that the GNN-based system may support only one specific (or a few similar) data structures. For example, the access engine shown in FIG. 4 may be able to support compressed sparse row (CSR) format in which nodes and edges of a graph may be stored in separate arrays, with the indices of these arrays corresponding to node identifiers and edge identifiers. However, for many of the other GNN data formats, such as a coordinate list (COO) format storing a list of (row, column, value) tuples (e.g., each tuple corresponds to a non-zero value and contains the row/column indices of the non-zero value), the hard-coded/wired internal pipeline in the access engine described in FIG. 4 may not be able to parse the data format and access the data properly.

Additional issues arise when the GNN-based system receives GNNs or graphs in multiple types of formats. For example, commonly used graph formats may include data formats based on the CSR format, the COO format, the linked list format, the array format, the dynamic graph format, the key-values format, the weight value on edge format, the coded attribute format, the indirect node-identifier format, the arbitrary number of hops format, the skipping fetch weight or attribute format, etc. Some GNN-based systems also receive GNNs or graphs that are in a combination of different types of formats. To be able to support all types of these formats or data structures, a new design is needed on the access engine to generalize the flow in fetching data for GNN processing.

Figure 5:
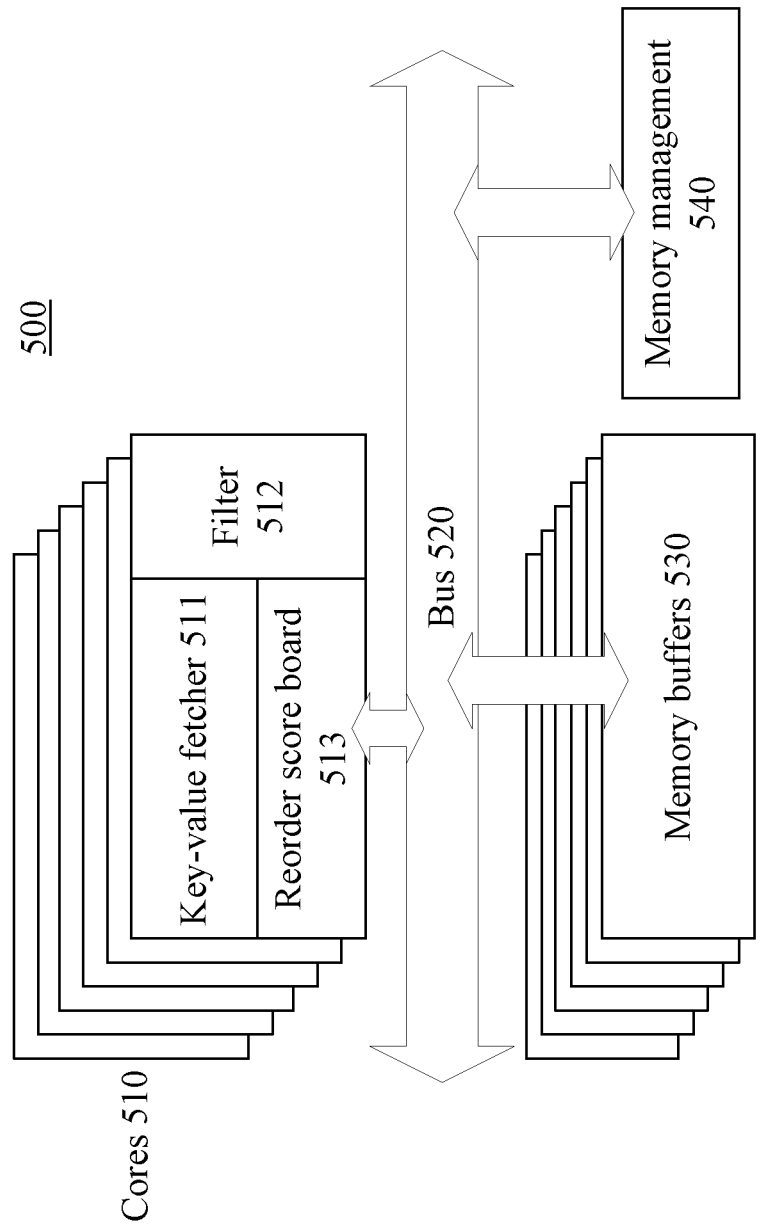
FIG. 5 is a schematic of an example improved GNN memory access system, according to some embodiments of this specification.

Embodiments of this specification provide novel systems and methods for accessing data for GNN processing across a wide range of data formats. FIG. 5 is a schematic of an example improved GNN memory access system, according to some embodiments of this specification. As shown in FIG. 5, the GNN memory access system 500 comprises a plurality of cores 510, a bus 520, and one or more memory buffers 530. In some embodiments, the plurality of cores 510 may access a memory storage that hosts the data for the GNN. For example, the memory storage may be a DDR (e.g., DDR shown in FIG. 4). The bus 520 may be communicatively coupled with the cores 510 and the memory buffers 530. In some embodiments, the bus 520 may be a crossbar switch that provides interconnections among the plurality of cores 510 and the memory buffers 530. In some embodiments, the memory buffers 530 may be multi-bank buffers. In some embodiments, the GNN memory access system 500 may replace the access engine described above. For example, the GNN memory access system 500 may replace the access engine of the GNN processing system 300 shown in FIG. 3. In some embodiments, the GNN memory access system 500 may replace the GNN module 220 of FIG. 2 or the GetNeighbor module 410, the GetSample module 420, and the GetAttribute module 430 shown in FIG. 4. In some embodiments, the GNN memory access system 500 may further include a memory management system 540 for managing memory access (e.g., memory access in the memory storage).

In some embodiments, each of the plurality of cores 510 may include a key-value fetcher 511, a filter 512, or a reorder score board 513. In some embodiments, the plurality of cores 510, including the key-value fetcher 511, the filter 512, and the reorder score board 513, may be programmable hardware (e.g., field-programmable gate array (FPGA)). For example, the plurality of cores 510 may be programmed by software, a software interface, or by software users through a software interface. The key-value fetcher 511 may be configured or programmed to perform key-value fetch functions. For example, the key-value fetcher 511 may receive an identifier (key), and fetch data corresponding to the identifier (values). The filter 512 may be configured or programmed to perform filtering functions. For example, for an input with multiple identifiers, the filter 512 may select, based on one or more filtering rules (e.g., sampling algorithms), a subset from the multiple identifiers. In some embodiments, the reorder score board 513 is a unit that may be configured to perform sorting or reordering for data received from the key-value fetcher 511 or the filter 512.

The software interface may be implemented in various ways. In some embodiments, the plurality of cores 510 may be programmed using one software interface. In some embodiments, each of the plurality of cores 510 may be programmed by a corresponding software interface. In some embodiments, the plurality of cores may be divided into groups, and each group may be programmed by a corresponding software interface.

In some embodiments, at least one of the cores 510, denoted as a first core, may be configured or programmed to replace the GetNeighbor module 410 in FIG. 4. For example, the first core may be configured to access or identify adjacent nodes for an input node identifier. As a result, similar to the GetNeighbor module 410 in FIG. 4, the first core performs a key-value fetch function, with the input node identifier as the key and the adjacent nodes or adjacent node identifiers as the values (e.g., the values are fetched based on the key). Therefore, the first core may perform the key-value fetch functions using the key-value fetcher 511. The key-value fetcher 511 may receive an input node identifier (key) and fetch adjacent node identifiers corresponding to the input node identifier (values). In some embodiments, the key-value fetcher 511 may be configured or programmed to fetch the input node identifier from the buffers 530, and write back to the buffers 530 the adjacent node identifiers, so that the adjacent node identifiers may be accessed by other cores 510.

In some embodiments, at least one of the cores 510, denoted as a second core, may be configured or programmed to replace the GetAttribute module 430 in FIG. 4. For example, the second core may be configured to receive information of selected or sampled nodes or node identifiers from the first core and fetch attribute data on the sampled nodes from memory (e.g., DDRs shown in FIG. 4). As a result, similar to the GetAttribute module 430 in FIG. 4, the second core performs a key-value fetch function, with the sampled node identifiers as the key for fetching the attribute data as the values. Therefore, the second core may perform key-value fetch functions using the key-value fetcher 511. The key-value fetcher 511 may receive the sampled node identifiers (key) and fetch attribute data corresponding to the sampled node identifiers (values).

In some embodiments, at least one of the cores 510, denoted as a third core, may be programmed to replace the GetSample module 420 in FIG. 4. For example, the third core is configured/programmed to receive adjacent node identifiers and perform node sampling according to the adjacent node identifiers to generate the sampled node identifiers. As a result, similar to the GetSample module 420 in FIG. 4, the third core performs a filtering function that selects a subset of node identifiers according to the adjacent node identifiers. Therefore, the third core may perform the filtering function using the filter 512, and select a subset of node identifiers in the graph as the sampled node identifiers according to the adjacent node identifiers.

Figure 6:
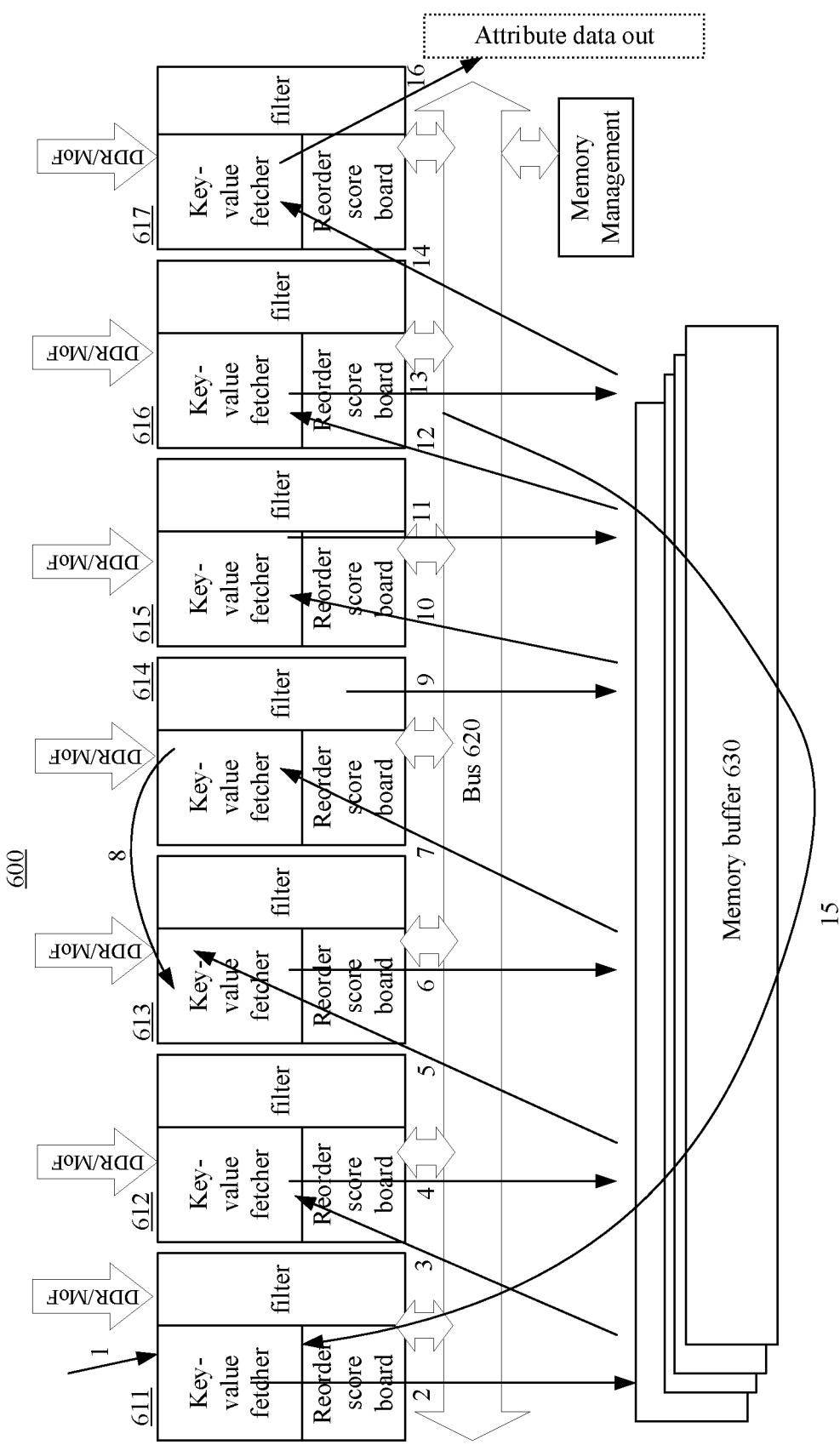
FIG. 6 is a schematic of an example improved GNN memory access system performing attribute data accessing, according to some embodiments of this specification.

In some embodiments, to make the functions of the various modules in FIG. 4 applicable to different data formats, multiple cores 510 may need to be configured or programmed for each of the modules. FIG. 6 is a schematic of an example improved GNN memory access system performing attribute data accessing, according to some embodiments of this specification. As shown in FIG. 6, the GNN memory access system 600 comprises a plurality of cores 611-617. In some embodiments, the GNN memory access system 600 shown in FIG. 6 is similar to the GNN memory access system 500 shown in FIG. 5, and the plurality of cores 611-617 is similar to the plurality of cores 510 shown in FIG. 5. The GNN memory access system 600 further comprises memory buffers 630 (e.g., similar to the memory buffers 530 of FIG. 5) a bus 620 (e.g., similar to the bus 520 of FIG. 5) that is communicatively coupled with the plurality of cores 611-617 and the memory buffer 630. In some embodiments, the GNN memory access system 600 further comprises a memory management (e.g., similar to the memory management 540 shown in FIG. 5). As shown in FIG. 6, the plurality of cores 611-617 are configured or programmed (e.g., via a software interface) to perform various steps in accessing the attribute data. For example, the various steps may include steps 1-16 shown in FIG. 6 using arrows. The GNN memory access system 600 may perform attribute data accessing for many different types of data formats, including the CSR format, the linked list format, the array format, the dynamic graph format, the indirect node-identifier format, the arbitrary number of hops format, or a combination of. For example, based on a specific data format, the plurality of cores may be programmed to accommodate the data format. In some embodiments, when the access system 600 needs to access attribute data stored in a new data format, the plurality of cores may be programmed again to accommodate the new data format.

As shown in FIG. 6, in step 1, the core 611 is configured or programmed to receive a root node identifier. In some embodiments, the root node identifier is received from a host, such as the processor 210 of FIG. 2. In step 2, the key-value fetcher of core 611 may be configured or programmed to fetch a pointer (value) corresponding to the root node based on the root node identifier (key). The pointer points to the root node's structure data, which may include an edge list pointer. In some embodiments, the pointer corresponding to the root node is fetched from a memory storage. For example, as shown in FIG. 6, the core 611 may access DDRs as a part of the memory storage. In some embodiments, the root node identifier already includes information on the pointer corresponding to the root node. As a result, steps 1-2 may not be needed to perform the key-value fetch to translate the root node identifier into the pointer. After the pointer corresponding to the root node is fetched, the pointer is written into the memory buffers 630 for a next core (e.g., core 612) to access. Since the memory buffer 630 is communicatively coupled with the plurality of cores 611-617 via the bus 620, each of the plurality of cores 611-617 may access and fetch data from the memory buffer 630.

In step 3, the core 612 is configured or programmed to receive and fetch the pointer corresponding to the root node from the memory buffer 630. In step 4, the key-value fetcher of the core 612 may be configured or programmed to fetch an edge list pointer corresponding to the root node (value) based on the received pointer corresponding to the root node). The edge list pointer points to a list of edge pointers for the root node. In some embodiments, the edge list pointer may be fetched from a memory storage. For example, as shown in FIG. 6, the core 612 may access DDRs as a part of the memory storage. After retrieving the edge list pointer, the core 613 is programmed or configured to write the edge list pointer to the memory buffer 630.

In step 5, the core 613 is configured or programmed to receive and fetch the edge list pointer from the memory buffer 630. In step 6, the key-value fetcher of the core 613 may be configured or programmed to fetch edge data on one or more edges based on the edge list pointer, and write the edge data to the memory buffer 630. In some embodiments, the edge data is fetched from a memory storage. For example, as shown in FIG. 6, the core 613 may access DDRs as a part of the memory storage. The edge data fetched in step 6 may include edges connecting the root node to its adjacent nodes. In some embodiments, the edge data includes edge identifiers or node identifiers of the adjacent nodes. In some embodiments, the one or more edge identifiers or the node identifiers are stored continuously in an array, and the memory address of the array is pointed to by the edge list pointer. In some embodiments, in addition to the memory address, the edge list pointer may also include a number of edges or adjacent nodes for the root node. As a result, when the key-value fetcher of the core 613 fetches the edge data, the key-value fetcher may locate the edge data based on the memory address, and fetch an array with a size of the number of edges.

In step 7, the core 614 is configured or programmed to receive and fetch the edge data from the memory buffer 630. In some embodiments, the edge data includes node identifiers of the adjacent nodes. In some embodiments, the node identifiers are stored in a linked list format or a dynamic graph format. As a result, one or more extra steps may be needed to fetch all the node identifiers of the adjacent nodes. For example, in step 8, a next pointer in the linked list may be provided to the key-value fetcher of the core 613, and the key-value fetcher of the core 613 may be configured or programmed to fetch edge data on one or more edges based on the next pointer. This step may be repeated until each pointer in the linked list has been processed. In step 9, the filter of the core 614 is configured or programmed to sample from the node identifiers of the adjacent nodes and select one or more sampled node identifiers. In some embodiments, the node identifiers of the adjacent nodes may be sampled according to one or more sampling algorithms, and the sampling algorithms may be programmed into the filter through the software interface. The core 613 is further configured or programmed to write the sampled node identifiers to the memory buffer 630.

In step 10, the core 615 is configured or programmed to receive and fetch the sampled node identifiers from the memory buffer 630. In step 11, the key-value fetcher of the core 615 may be configured or programmed to fetch sampled pointers pointing to the structure data of the sampled node identifiers, and write the sampled pointers to the memory buffer 630. In some embodiments, the sampled pointers may be fetched from a memory storage. For example, as shown in FIG. 6, the core 615 may access DDRs as a part of the memory storage. In some embodiments, the structure data of the sampled node identifiers may include sampled attribute pointers pointing to the attribute data of the sampled node identifiers.

In step 12, The core 616 is configured or programmed to receive and fetch the sampled pointers pointing to the structure data of the sampled node identifiers from the memory buffer 630. In step 13, the key-value fetcher may be configured or programmed to fetch the sampled attribute pointers pointing to the attribute data of the sampled node identifiers using the sampled pointers. In some embodiments, the sampled attribute pointers may be fetched from a memory storage. For example, as shown in FIG. 6, the core 616 may access DDRs as a part of the memory storage. The core 616 is further configured or programmed to write the sampled attribute pointers to the memory buffer 630. In some embodiments, the sampled node identifiers already include information on the sampled pointers. As a result, steps 12-13 may not be needed to perform the key-value fetch to translate the sampled node identifiers into the sampled pointers. In some embodiments, steps 12-13 may be suitable for data formats that include node identifiers that are indirectly associated with the pointer (e.g., the indirect node identifier format).

In step 14, the core 617 is configured or programmed to receive and fetch the sampled attribute pointers from the memory buffer 630. In some embodiments, there may be more than one root nodes. As a result, one or more extra steps may be needed to fetch all the sampled attribute pointers for each of the root node identifiers. For example, in step 15, a loop operation may be initiated to perform some or all of the steps 1-14 for another root node identifier. One of the cores (e.g., the core 617) may be configured or programmed to initiate the loop operation. In some embodiments, the sampled node's adjacent nodes may need to be accessed. For example, in the arbitrary number of hops format, an indirectly connected node that is multiple edges away from the root node may need to be accessed. As a result, one or more extra steps may be needed to fetch the attribute pointers for these nodes. For example, in step 15, a loop operation may be initiated to perform some or all of the steps 1-14 for the sampled node. One of the cores (e.g., the core 615) may be configured or programmed to initiate the loop operation based on the sampled node identifiers.

In step 16, the key-value fetcher of the core 617 may be configured or programmed to fetch the attribute data of the sampled node identifiers using the sampled attribute pointers. In some embodiments, the attribute data of the sampled node identifiers may be fetched from a memory storage. For example, as shown in FIG. 6, the core 611 may access DDRs as a part of the memory storage. In some embodiments, the core 617 may be further configured or programmed to send the fetched attribute data to other units for GNN processing (e.g., dedicated processor 240 shown in FIG. 2 or execution engines shown in FIG. 3).

As shown in FIG. 6, the GNN memory access system 600 includes a plurality of cores that may be configured or programmed to realize many of the functionalities for the access engine shown in FIG. 2. At the same time, because the cores of the GNN memory access system 600 are programmable through software programmable interface(s), they may be flexibly programmed to fit a variety of different data structures, including the CSR format, the linked list format, the array format, the dynamic graph format, the indirect node-identifier format, the arbitrary number of hops format, or any combination thereof. Moreover, if the data format changes from an old data format to a new data format, the plurality of cores may be programmed again to accommodate the new data format. Therefore, the functionalities of the GNN memory access system are greatly improved, and the usability of the system is expanded to handle many more input data formats.

Figure 7:
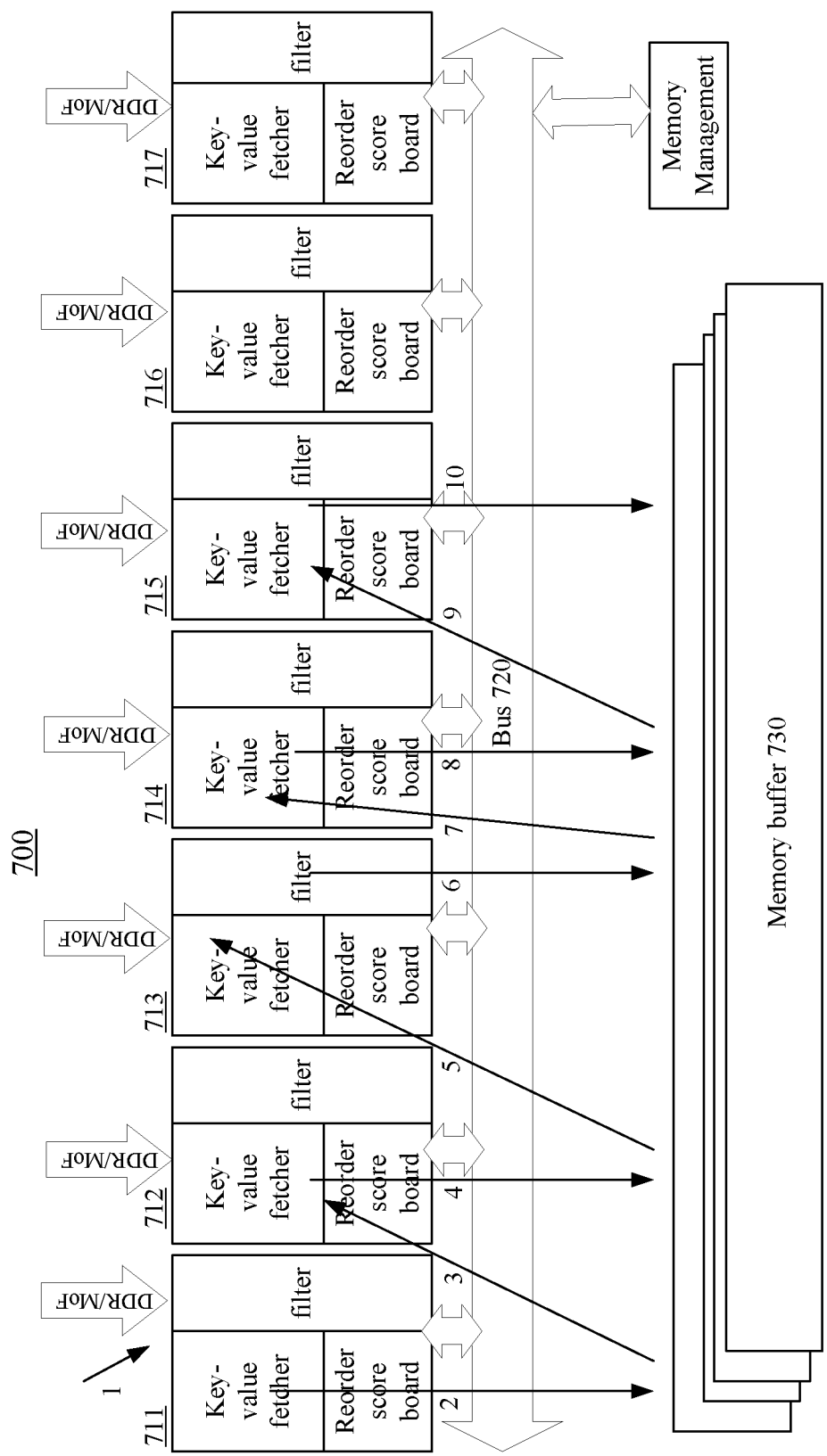
FIG. 7 is a schematic of an example improved GNN memory access system performing attribute data accessing, according to some embodiments of this specification.

In some embodiments, to realize the functions of the various modules in FIG. 4 for various GNN data formats, such as the COO format, the multiple cores 510 shown in FIG. 5 may need to be configured or programmed in different manners. FIG. 7 is a schematic of an example improved GNN memory access system performing attribute data accessing, according to some embodiments of this specification. As shown in FIG. 7, the GNN memory access system 700 comprises a plurality of cores 711-717. In some embodiments, according to the GNN data format in which the graph data is stored, some of the cores (e.g., the cores 716-717) may be configured or programmed to implement the proper data accessing method to access the data stored in the data format. In some embodiments, the GNN memory access system 700 shown in FIG. 7 is similar to the GNN memory access system 500 shown in FIG. 5, and the plurality of cores 711-717 is similar to the plurality of cores 510 shown in FIG. 5. The GNN memory access system 700 further comprises memory buffers 730 (e.g., similar to the memory buffers 530 of FIG. 5) a bus 720 (e.g., similar to the bus 520 of FIG. 5) that is communicatively coupled with the plurality of cores 711-717 and the memory buffer 730. In some embodiments, the GNN memory access system 700 further comprises a memory management (e.g., similar to the memory management 540 shown in FIG. 5). As shown in FIG. 7, the plurality of cores 711 and 717 are configured or programmed to perform various steps in accessing the attribute data. For example, the various steps may include steps 1-11 shown in using arrows in FIG. 7. The GNN memory access system 700 may perform attribute data accessing for many different types of data formats, including the COO format, the array format, the key-values format, the weight value on edge format, the coded attribute format, or a combination of.

As shown in FIG. 7, in step 1, the core 711 is configured or programmed to receive a root node identifier. In some embodiments, the root node identifier is received from a host, such as the processor 210 of FIG. 2. In step 2, the key-value fetcher of core 711 may be configured or programmed to fetch an edge list pointer corresponding to the root node (value) based on the root node identifier (key). The edge list pointer points to a list of edge pointers for the root node. In some embodiments, the edge list pointer may be fetched from a memory storage. For example, as shown in FIG. 7, the core 711 may access DDRs as a part of the memory storage. After retrieving the edge list pointer, the core 711 is programmed or configured to write the edge list pointer to the memory buffer 730. Since the memory buffer 730 is communicatively coupled with the plurality of cores 711-715 via the bus 720, each of the plurality of cores 711-715 may access and fetch data from the memory buffer 730.

In step 3, the core 712 is configured or programmed to receive and fetch the edge list pointer from the memory buffer 630. In step 4, the key-value fetcher of the core 712 is programmed or configured to fetch edge data on one or more edges based on the edge list pointer. In some embodiments, the edge data may be fetched from a memory storage. For example, as shown in FIG. 7, the core 712 may access DDRs as a part of the memory storage. The edge data fetched in step 4 may include edges connecting the root node to its adjacent nodes. In some embodiments, the edge data includes edge identifiers and/or node identifiers of the adjacent nodes. In some embodiments, the edge data includes weight values, and the key-value fetcher of the core 712 may be programmed or configured to fetch the weight value of each edge together with the edge data. In some embodiments, the reorder score board of the core 712 may be configured or programmed to sort the edge data based on the weight value of each edge. The sorted weight values of the edges may facilitate the subsequent node sampling step. For example, the adjacent nodes connected with edges that have weight values greater than a threshold may be sampled as positive samples, In some embodiments, the edge data may be sorted so that the edge with a lower weight value is stored before the edge with a higher weight value. In some embodiments, the core 712 is further programmed or configured to store the edge data into the memory buffer 730.

In step 5, the core 713 is configured or programmed to receive and fetch the edge data from the memory buffer 730. In some embodiments, the edge data includes node identifiers of the adjacent nodes. In some embodiments, the edge data includes weight values for the edges. In step 6, the filter of the core 713 is configured or programmed to sample from the node identifiers of the adjacent nodes and select one or more sampled node identifiers. In some embodiments, the sampled node identifiers are selected according to the weight values of the edges. For example, the edge information may be sorted from previous steps (e.g., step 4). As a result, the filter of the core 713 may be configured or programmed to select, from the first portion of the edge data (e.g., edges with smaller weight values), the sampled node identifiers. The core 713 is further configured or programmed to write the sampled node identifiers to the memory buffer 730.

In step 7, the core 714 is configured or programmed to receive and fetch the sampled node identifiers from the memory buffer 730. In some embodiments, the graph is stored in the coded attribute format. As a result, extra steps may be needed to acquire the attribute data of the sampled nodes from the sampled node identifiers. For example, in step 8, the key-value fetcher of the core 714 may be configured or programmed to fetch the code of the sampled node identifiers, and write the coded sampled node identifiers to the memory buffer 730. In some embodiments, the code of the sampled node identifier may be fetched from a memory storage. For example, as shown in FIG. 7, the core 714 may access DDRs as a part of the memory storage. In step 9, the key-value fetcher of the core 715 is configured or programmed to receive and fetch the coded sampled node identifiers from the memory buffer 730. In step 10, the key-value fetcher of the core 715 may be configured or programmed to fetch the attribute data of the sampled node identifiers using the coded sampled node identifiers. In some embodiments, the attribute data may be fetched from a memory storage. For example, as shown in FIG. 7, the core 715 may access DDRs as a part of the memory storage. In some embodiments, the graph is not stored in the coded attribute format. As a result, steps 8-9 may be skipped, and the core 714 is configured or programmed to fetch the attribute data of the sampled node identifiers using the sampled node identifiers. In some embodiments, the core 714 or the core 715 may be further configured or programmed to send the fetched attribute data to other units for processing (e.g., dedicated processor 240 shown in FIG. 2 or execution engines shown in FIG. 3).

As shown in FIG. 7, the GNN memory access system 700 includes a plurality of cores that may be configured or programmed to realize many of the functionalities for the access engine shown in FIG. 2. At the same time, because the cores of the GNN memory access system 700 are programmable through software programmable interface(s), they may be flexibly programmed to fit a variety of different data structures, including the COO format, the array format, the key-values format, the weight value on edge format, the coded attribute format, or any combination thereof. As shown in FIG. 6 and FIG. 7, the hardware setup of the systems 600 and 700 may be the same or similar. At the same time, based on different ways to program or configure each component of the system (e.g., the plurality of cores), the GNN memory access system may be configured to support a wide range of graph data structures. Therefore, the functionalities of the GNN memory access system are greatly improved, and the usability of the system is expanded to handle many more input data formats.

It is appreciated that the steps programmed into the plurality of cores shown in FIG. 6 and FIG. 7 are exemplary. Depends on the exact GNN data structure, more cores or fewer cores may be programmed, and the programming on each core may be adjusted accordingly to best fit the need in accessing the given GNN data structure. One of the advantages of the GNN memory access systems shown in FIG. 5, FIG. 6, and FIG. 7 is the flexibility provided in the programmable hardware, so that potentially various GNN data structures may be handled by the GNN memory access system through hardware programming.

As shown in FIG. 6 and FIG. 7, each core of the GNN memory access systems may be programmed to suit particular needs in performing attribute data accessing in each type of the data structures. The software interface used to program these cores may provide many programmable or configurable parameters for programming. For example, for the key-value fetcher of each core, the parameters may include a memory address of the memory buffer storing a key of the key-value fetching, a memory address of the memory storage storing a value of the key-value fetching, a number of key-value pairs to fetch, a length of data to fetch, a target memory address of the memory buffer for writing results of the key-value fetch, or a flag indicating whether reordering is enabled. For the filter of each core, the parameters may include a sampling algorithm or a regular expression for filtering sampled results generated by the sampling algorithm.

Figure 8:
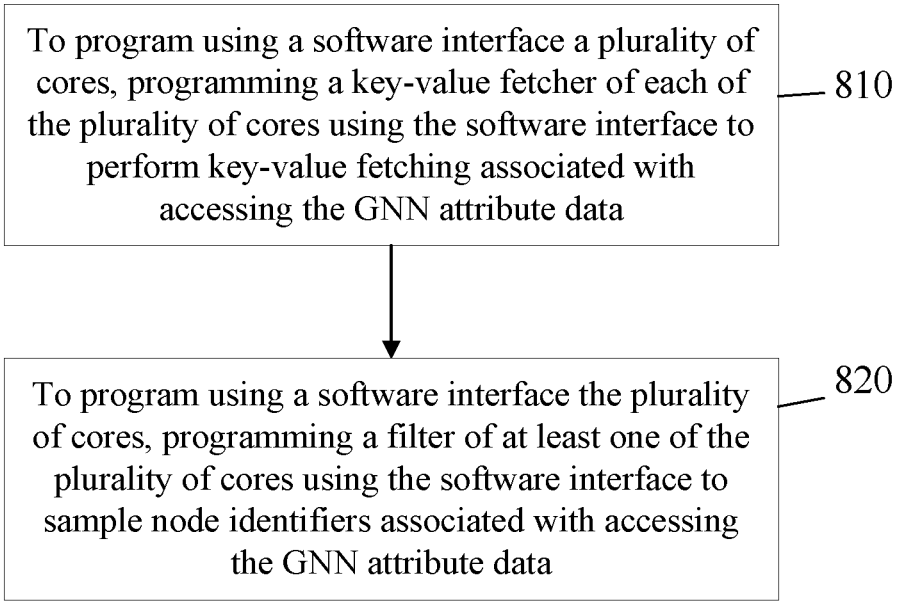
FIG. 8 is a flowchart of an example method for accessing GNN attribute data in GNN processing, according to some embodiments of this specification.

Embodiments of this specification further provide methods for accessing GNN attribute data in GNN processing. FIG. 8 is a flowchart of an example method for accessing GNN attribute data in GNN processing, according to some embodiments of this specification. It is appreciated that method 800 shown in FIG. 8 may be performed by the system 500 shown in FIG. 5.

In step 810, to program using a software interface a plurality of cores, the key-value fetcher of each of the plurality of cores are programmed using the software interface to perform key-value fetcher associated with accessing the GNN attribute data. For example, as shown in FIG. 6 and FIG. 7, the key-value fetcher of each of the cores in the GNN memory access systems 600 and 700 is programmed to perform one or more steps in accessing the GNN attribute data.

In some embodiments, the method 800 further comprises a step to determine a data format corresponding to the GNN processing. The data formats may include, for example, the linked list format, the array format, the dynamic graph format, the key-values format, the weight value on edge format, the coded attribute format, the indirect node-identifier format, the arbitrary number of hops format, the skipping fetch weight or attribute format, other formats, or a combination thereof. The plurality of cores may be programmed according to the determined data format. For example, if the data format is determined to be the CSR format, the plurality of cores may be programmed in a similar fashion as the plurality of cores in the GNN memory access system 600 shown in FIG. 6. In another example, if the data format is determined to be a COO format, the plurality of cores may be programmed in a similar fashion as the plurality of cores in the GNN memory access system 700 shown in FIG. 7. In some embodiments, if the data format changes from an old data format to a new data format, the plurality of cores may be programmed again to accommodate the new data format.

The data format may be determined by various means. For example, it may be manually specified or input or automatically detected. In some embodiments, a GNN accelerator implementing the method 800 may receive a root node for GNN processing. The GNN accelerator may determine a memory address of an external memory storing the attribute data of the root node. By reading a header of the attribute data (e.g., such as a metadata portion of the attribute data), the GNN accelerator may learn the data format of the root node's (and other graph nodes') attribute data. The data format may be used to compute a data size of the attribute data of each graph node. For example, if the data format is CSR, the data size includes the sizes of three one-dimensional arrays; and if the data format is COO, the data size includes the sizes of 3-tuples. After learning the data size, the GNN accelerator may fetch data of the data size from the memory address of the external memory to obtain the attribute data of the root node. The data may include edge identifiers of the edges connecting the root node and its neighboring nodes, node identifiers of the neighboring nodes, weights of the edges, or any combination thereof. The GNN accelerator may perform sampling based on the fetched data to obtain one or more sampled nodes for GNN processing of the root node. In some embodiments, the sampling may be based on the weights of the edges connecting the root node and the neighboring nodes. For example, the edges may be sorted/reordered according to the weights. The neighboring nodes corresponding to the edges with weights greater than a threshold may be obtained as the sampled nodes. Subsequently, the GNN accelerator may determine the memory addresses of the attribute data of the sampled nodes in the memory (e.g., the external memory). By reading data of the data size from the memory addresses, the GNN accelerator may obtain the attribute data of the sampled nodes and send the fetched attribute data to GNN processors (e.g., GPU, TPU, NPU, etc.) for the GNN processing of the root node.

In some embodiments, the above-described functionalities may be realized by programming the key-value fetcher, the filter, the reorder board of each of the plurality of cores in the GNN accelerator. The programming the key-value fetcher using the software interface may include programming at least one of configurable parameters. For example, the configurable parameters may include a memory address of the memory buffer storing a key of the key-value fetching, a memory address of the memory storage storing a value of the key-value fetching, a number of key-value pairs to fetch, a length of data to fetch, a target memory address of the memory buffer for writing results of the key-value fetch, or a flag indicating whether reordering is enabled.

In some embodiments, the key-value fetcher may be programmed to determine a memory address of the first memory storing a value corresponding to the key, fetch the value corresponding to the key from the memory address, and write the fetched value into the first memory. For example, as shown in steps 3 and 4 of FIG. 6, the key-value fetcher of the core 612 is programmed to fetch the pointer corresponding to the root node from the memory buffer 630 based on a determined memory address in the memory buffer 630, where the fetched pointer corresponding to the root node is a key in the key-value fetching. The key-value fetcher of core 612 then fetches an edge list pointer corresponding to the root node using the key, and write the edge list pointer into the memory buffer. In some embodiments, additional configurable parameters may be programmed for each key-value fetcher. For example, as shown in steps 3 and 4 of FIG. 6, the length of the pointer corresponding to the root node may be determined and programmed into the configurable parameter a number of key-value pairs to fetch. Moreover, the length of the edge list pointer may be determined and programmed into the configurable parameter the length of data to fetch.

In some embodiments, to program the key-value fetcher of each of the plurality of cores, the key-value fetcher of a first core is programmed through the software interface to determine an address in the memory buffer from which to fetch edge data of a root node and fetch the edge data of the root node from the determined address. For example, as shown in step 7 of FIG. 6 or step 5 of FIG. 7, the key-value fetcher of core 614 or core 713 may be programmed to fetch the edge data from the memory buffer 630 using a determined address in the memory buffer 630.

In some embodiments, to program the key-value fetcher of each of the plurality of cores, the key-value fetcher of a second core is programmed through the software interface to determine an address in the memory buffer from which to fetch an edge list pointer of the root node, fetch the edge list pointer of the root node from the determined address, fetch one or more identifiers of the neighboring nodes of the root node based on the edge list pointer, and write the one or more identifiers of the neighboring nodes of the root node into the memory buffer for the first core to access. For example, as shown in steps 5 and 6 of FIG. 6, the key-value fetcher of core 613 may be programmed to fetch the edge list pointer from the memory buffer 630 using a determined address in the memory buffer 630, and fetch the edge data including the identifiers of neighboring nodes from the memory storage based on the edge list pointer. In some embodiments, additional configurable parameters may be programmed. For example, the length of the edge data may be programmed as a configurable parameter the length of data to fetch.

In some embodiments, to program the key-value fetcher of each of the plurality of cores, the key-value fetcher of a third core is programmed through the software interface to receive a root node identifier corresponding to the root node, fetch a pointer corresponding to the root node according to the root node identifier, and write the pointer corresponding to the root node into the memory buffer for other cores to access. For example, as shown in steps 1 and 2 of FIG. 6 and steps 1 and 2 of FIG. 7, the key-value fetcher of core 611 or core 711 may be programmed to receive the root node identifier from a host and fetch a pointer corresponding to the root node from the memory storage based on the root node identifier. The pointer may be written into the memory buffer 630 or 730.

In some embodiments, to program the key-value fetcher of each of the plurality of cores, the key-value fetcher of a fourth core is programmed through the software interface to determine an address in the memory buffer form which to fetch the pointer corresponding to the root node, fetch the pointer corresponding to the root node from the memory buffer based on the determined address, determine the edge list pointer according to the pointer corresponding to the root node, and write the edge list pointer to the memory buffer for the second core to access. For example, As shown in steps 3 and 4 of FIG. 6, the key-value fetcher of core 612 is programmed to fetch the pointer corresponding to the root node from the memory buffer 630 based on a determined address, fetch the edge list pointer corresponding to the root node based on the received pointer from the memory storage, and write the edge list pointer to the memory buffer 630 for core 613 to access.

In some embodiments, to program the key-value fetcher of each of the plurality of cores, the key-value fetcher of a fifth core is programmed through the software interface to determine an address in the memory buffer from which to fetch sampled node identifiers, fetch the sampled node identifiers from the first memory using the determined address, fetch sampled pointers pointing to attribute data of the sampled node identifiers stored in the memory storage, and write the sampled pointers to the first memory for other cores to access. In some embodiments, many of these steps may be programmed into more than one cores. For example, as shown in steps 10-14 of FIG. 6, the key-value fetcher of core 615 may be programmed to fetch the sampled node identifiers from the memory buffer 630, fetch the sampled pointers pointing to the structure data of the sample node identifiers, and write the sampled pointers to the memory buffer 630 for core 616 to access. In addition, the key-value fetcher of core 616 may be programmed to fetch the sampled pointers pointing to the structural data of the sampled node identifiers from the memory buffer 630, fetch the sampled pointers from the memory storage, and write the sampled attribute pointers to the memory buffer 630.

In some embodiments, to program the key-value fetcher of each of the plurality of cores, the key-value fetcher of a sixth core is programmed through the software interface to determine an address in the memory buffer form which to fetch sampled pointers, fetch the sampled pointers from the memory buffer based on the determined address, fetch the attribute data from the memory storage using the sampled pointers, and send the attribute data to a dedicated processor for GNN processing. For example, as shown in steps 15 and 16 of FIG. 6, the key-value fetcher of core 617 is programmed to fetch the attribute data of the sampled node identifiers using the sampled attribute pointers from the memory storage. The key-value fetcher of the core 617 may be further programmed to send the fetched attribute data to other units for GNN processing.

In some embodiments, additional steps may be programmed into the plurality of cores as a part of the step to program the key-value fetcher of each of the plurality of cores. For example, any of the steps shown in FIG. 6 or FIG. 7 directed towards the key-value fetchers in the systems may be programmed into the key-value fetchers of the plurality of cores.

Referring back to FIG. 8. In step 820, to program using a software interface the plurality of cores, the filter of at least one of the plurality of cores is programmed using the software interface to sample node identifiers associated with accessing the GNN attribute data. For example, as shown in FIG. 6 and FIG. 7, the filter of core 614 or core 713 may be programmed to sample from the node identifiers of the adjacent nodes and select one or more sampled node identifiers. The core 614 or core 713 (e.g., the key-value fetcher or the filter of core 614 or core 713) may be further programmed to write the sampled node identifiers to the memory buffer 630.

In some embodiments, programming the filter using the software interface may include programming at least one of configurable parameters. For example, the configurable parameters may include a sampling algorithm or a regular expression for filtering sampled results generated by the sampled algorithm. In some embodiments, additional steps may be programmed into the plurality of cores as a part of the step to program the filter of each of the plurality of cores.

For each step described in method 800 of FIG. 8, based on the exact type of data structure in GNN processing, a single step may be programmed into multiple cores, or multiple steps may be programmed into one core.

Each process, methods, and algorithms described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they may be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A system for accessing graph neural network (GNN) attribute data in GNN processing, comprising:
a plurality of cores, each of the plurality of cores comprises a key-value fetcher and a filter, and is programmable using a software interface to support a plurality of data formats of the GNN attribute data, wherein:
the key-value fetcher is programmable using the software interface according to one of the plurality of data formats for performing key-value fetching associated with accessing the GNN attribute data, and the filter of at least one of the plurality of cores is programmable using the software interface according to the one of the plurality of data formats for sampling node identifiers associated with accessing the GNN attribute data; and a first memory communicatively coupled with the plurality of cores, wherein the first memory is configured to store data shared by the plurality of cores.

2. The system of claim 1, wherein the software interface comprises at least one or more of the following configurable parameters for programming the key-value fetcher:
a memory address of the first memory storing a key of the key-value fetching;
a memory address of a second memory storing a value of the key-value fetching;
a number of key-value pairs to fetch;
a length of data to fetch;
a target memory address of the first memory for writing results; or
a flag indicating whether reordering is enabled.

3. The system of claim 1, wherein the software interface comprises at least one of the following configurable parameters for programming the filter:
a sampling algorithm; or
a regular expression for filtering sampled results generated by the sampling algorithm.

4. The system of claim 1, wherein:
the plurality of cores include at least one core; and
the key-value fetcher of the at least one core is programmable through the software interface to:
determine a memory address of a second memory storing a value corresponding to the key;
fetch the value corresponding to the key from the memory address of the second memory; and
write the fetched value into the first memory.

5. The system of claim 1, wherein:
the plurality of cores include a first core;
the key-value fetcher of the first core is programmable through the software interface to:
determine an address in the first memory from which to fetch edge data of a root node, wherein the edge data includes identifiers of neighboring nodes of the root node, and
fetch, from the determined address, the edge data of the root node; and
the filter of the first core is programmable through the software interface to:
sample from the identifiers of neighboring nodes in the edge data to determine one or more sampled node identifiers using a sampling algorithm, and
write the one or more sampled node identifiers into the first memory.

6. The system of claim 5, wherein:
the edge data of the root node includes a weight value on each edge of the root node; and
the filter of the first core is programmable through the software interface to:
sample according to the weight value on each edge of the root node to determine the one or more sampled node identifiers.

7. The system of claim 5, wherein:
the plurality of cores include a second core; and
the key-value fetcher of the second core is programmable through the software interface to:
determine an address in the first memory from which to fetch an edge list pointer of the root node,
fetch, from the determined address, the edge list pointer of the root node, wherein the edge list pointer points to a list of edges of the root node stored in a second memory, and each of the list of edges connects the root node to a neighboring node,
fetch one or more identifiers of the neighboring nodes of the root node based on the list of edges of the root node from the second memory, and
write the one or more identifiers of the neighboring nodes of the root node into the first memory for the first core to access.

8. The system of claim 7, wherein:
the plurality of cores include a third core; and
the key-value fetcher of the third core is programmable through the software interface to:
receive a root node identifier corresponding to the root node,
determine the edge list pointer according to the root node identifier, and
write the edge list pointer into the first memory for the second core to access.

9. The system of claim 7, wherein:
the plurality of cores include a third core and a fourth core;
the key-value fetcher of the third core is programmable through the software interface to:
receive a root node identifier corresponding to the root node,
fetch a pointer corresponding to the root node according to the root node identifier, wherein the pointer corresponding to the root node identifier points to the root node's structure data, and the root node's structure data includes the edge list pointer, and
write the pointer corresponding to the root node into the first memory for the fourth core to access; and
the key-value fetcher of the fourth core is programmable through the software interface to:
determine an address in the first memory from which to fetch the pointer corresponding to the root node,
fetch, from the determined address, the pointer corresponding to the root node from the first memory,
determine the edge list pointer according to the pointer corresponding to the root node, and
write the edge list pointer to the first memory for the second core to access.

10. The system of claim 5, wherein:
the plurality of cores include a fifth core and a sixth core;
the key-value fetcher of the fifth core is programmable through the software interface to:
determine an address in the first memory from which to fetch the sampled node identifiers,
fetch, from the determined address, the sampled node identifiers from the first memory,
fetch sampled pointers pointing to attribute data of the sampled node identifiers stored in a second memory, and
write the sampled pointers to the first memory for the sixth core to access; and
the key-value fetcher of the sixth core is programmable through the software interface to:
determine an address in the first memory from which to fetch the sampled pointers,
fetch, from the determined address, the sampled pointers from the first memory, fetch the attribute data from the second memory using the sampled pointers, and send the attribute data to a dedicated processor for GNN processing.

11. The system of claim 1, wherein each of the plurality of cores further comprises a reorder score board, wherein the reorder score board is programmable through the software interface to:

receive data from the key-value fetcher or the filter in the same core; and sorting the received data.

12. The system of claim 1, wherein each of the plurality of cores is implemented on field programmable gate arrays (FPGA).

13. The system of claim 1, wherein the plurality of data formats includes a compressed sparse row (CSR) format and a coordinate list (COO) format.

14. A system for accessing graph neural network (GNN) attribute data in GNN processing, comprising:

a plurality of cores implemented on a field programmable gate arrays (FPGA) and programmable through a software interface to support a plurality of data formats of the GNN attribute data, wherein the plurality of cores include a first core and each of the plurality of cores includes a key-value fetcher and a filter; and a first memory communicatively coupled with the plurality of cores, the first memory configured to store data shared by the plurality of cores, wherein:

the key-value fetcher of the first core is programmable through the software interface according to one of the plurality of data formats to:

determine an address in the first memory from which to fetch edge data of a root node in the GNN processing, wherein the edge data includes identifiers of neighboring nodes of the root node, and fetch, from the determined address, the edge data of the root node; and the filter of the first core is programmable through the software interface to:

sample from the identifiers of the neighboring nodes in the edge data to determine one or more sampled node identifiers through a sampling algorithm, and write the one or more sampled node identifiers into the first memory.

15. The system of claim 14, wherein:

the plurality of cores further include a second core; and the key-value fetcher of the second core is programmable through the software interface according to the one of the plurality of data formats to:

determine an address in the first memory from which to fetch an edge list pointer of the root node, fetch, from the determined address, the edge list pointer of the root node, wherein the edge list pointer points to a list of edges of the root node stored in a second memory, and each of the list of edges connects the root node to a neighboring node, fetch one or more identifiers of the neighboring nodes of the root node based on the list of edges of the root node from the second memory, and write the one or more identifiers of the neighboring nodes of the root node into the first memory for the first core to access.

16. The system of claim 15, wherein:

the plurality of cores further include a third core; and the key-value fetcher of the third core is programmable through the software interface according to the one of the plurality of data formats to:

receive a root node identifier corresponding to the root node, determine the edge list pointer according to the root node identifier, and write the edge list pointer into the first memory for the third core to access.

17. The system of claim 14, wherein:

the plurality of cores include at least one core; and the key-value fetcher of the at least one core is programmable through the software interface according to the one of the plurality of data formats to:

determine a memory address of a second memory storing a value corresponding to the key;

fetch the value corresponding to the key from the memory address of the second memory; and write the fetched value into the first memory.

18. A method for accessing graph neural network (GNN) attribute data in GNN processing, comprising:

receiving, by a GNN accelerator, a root node identifier of a root node for GNN processing, wherein the GNN accelerator comprises a plurality of cores that are programmable through a software interface;

determining, by the GNN accelerator, a data format from a plurality of data formats in which attribute data of the root node is stored, wherein the plurality of data formats is supported by the GNN accelerator;

determining, by one or more cores in the plurality of cores, a memory address of an external memory based on the root node identifier and a data size based on the data format;

fetching, by the one or more cores, data of the data size from the memory address of the external memory, wherein the data comprises identifiers of neighboring nodes of the root node;

sampling, by the one or more cores, one or more of the neighboring nodes;

fetching, by the one or more cores, attribute data corresponding to the one or more sampled nodes based on identifiers of the one or more sampled nodes and the data size; and sending, by the one or more cores, the attribute data to a GNN processor for GNN processing.

19. The method of claim 18, wherein the determining, by the GNN accelerator, the data format in which the attribute data of the root node is stored comprises:

reading a header of the attribute data of the root node; and determining the data format based on the header.

20. The method of claim 18, wherein the fetching, by the one or more cores, the data of the data size from the memory address of the external memory further comprises:

fetching, by a key-value fetcher of the one or more cores in the GNN accelerator, the data of the data size from the memory address of the external memory, wherein the key-value fetcher of the core is programmed based on the data format.

* * * * *